NARROW BAND IMAGE TRANSMISSION

Filed Nov. 7, 1955 4 Sheets-Sheet 1

INVENTORS M. E. HINES
W. E. KIRKPATRICK
BY Harry C. Hart
ATTORNEY

March 22, 1960 M. E. HINES ET AL 2,929,869

NARROW BAND IMAGE TRANSMISSION

Filed Nov. 7, 1955 4 Sheets-Sheet 2

INVENTORS M. E. HINES
W. E. KIRKPATRICK

BY Harry C. Hart

ATTORNEY

March 22, 1960 M. E. HINES ET AL 2,929,869
NARROW BAND IMAGE TRANSMISSION
Filed Nov. 7, 1955 4 Sheets-Sheet 3

INVENTORS M. E. HINES
W. E. KIRKPATRICK
BY Harry C. Hart
ATTORNEY

INVENTORS M. E. HINES
W. E. KIRKPATRICK
BY Harry C. Hart
ATTORNEY 2,929,869
Patented Mar. 22, 1960

2,929,869

NARROW BAND IMAGE TRANSMISSION

Marion E. Hines, Kellers Church, Pa., and William E. Kirkpatrick, Chatham, N.J., assignors to Bell Telephone Laboratories, Incorporated, New York, N.Y., a corporation of New York Application November 7, 1955, Serial No. 545,164

19 Claims. (Cl. 178—6.8)

This invention relates to the transmission of image signals over standard telephone channels and particularly to communication by way of such signals as an adjunct or accompaniment to conventional voice message telephony. It has for its principal object to simplify the transmission of such accompanying images and to improve their quality.

In an application of W. E. Kock and R. L. Miller, Serial No. 459,300, filed September 30, 1954, now Patent 2,895,005, granted July 14, 1959, a system is described by which image signals of quality suitable to accompany a telephone conversation are transmitted from each party to the other party over a standard telephone channel, e.g., one having a band width of not more than 4,000 cycles per second. This result is achieved by the establishment of an optimum compromise between image reproduction rate and image size. It is found that when successive images are reproduced not more than about once per second, the viewer receives an impression of movement at the scene without objectionable flicker; and that when the overall dimensions of the image are restricted to an area of the order of not more than about 3 centimeters square, its size and detail are ample for the needs of the telephone subscriber at the normal viewing distance. The image signal from which such a picture is reconstructed requires for its transmission a band of only 4,000 cycles per second width, i.e., exceedingly narrow by conventional television standards.

The system of the Kock-Miller application is actualized by selecting, at the transmitter station, one of a number of frames of an ordinary image signal and rejecting the others; recording this selected frame, transmitting a signal derived from the record at slow speed to the receiver station, recording it as received, and finally deriving from the received record, and in rapid succession, a number of like images for display. In that system the recording media chosen for illustration were magnetic tapes. Because of the need, at the receiver station, of such a system for recording each incoming image while displaying its predecessor, the Kock-Miller application employs two such magnetic tapes, operated in alternation.

The magentic tapes of the Kock-Miller system, the mechanisms for advancing them, for recording image signals on them at one speed and for deriving image signals from them at a different speed are from some standpoints awkward and cumbersome. Accordingly, a more specific object of the present invention is to replace the magnetic tapes of the Kock-Miller system with electronic instrumentalities, and in particular to replace the two alternately operated receiver tapes and all their associated mechanisms with a single electronic device.

The present invention makes use of an image signal generator of which the photosensitive screen is periodically exposed for a brief interval to the scene to be transmitted. Each such exposure forms an electrostatic image of the scene on the photosensitive screen. The exposures may, for example, take place at intervals of one second, each enduring for $\frac{1}{30}$ second. The cathode beam scans this image to derive a vision signal from it. In accordance with the present invention this scanning operation takes place slowly and consumes the entire second during $\frac{29}{30}$ of which the photosensitive screen is shielded from the scene. Moreover, in accordance with the present invention scanning proceeds in a direction perpendicular to that in which the reproduced image is to be built up: inasmuch as horizontal scanning is preferred for purposes of display, the scanning at the transmitter station takes place in the vertical direction and along a number of vertical lines each of which is horizontally displaced from its predecessor.

The slow speed, narrow band image signal which results from these operations is transmitted to a receiver station where it is applied to modulate the cathode beam of a direct view storage tube. This tube is provided with a perforated storage screen or grid as well as the usual luminescent screen, an electron gun which projects a cathode ray beam, beam focussing elements and beam deflecting elements. The beam is caused to scan the storage screen at a relatively high speed and in a direction perpendicular to the direction of scanning at the transmitter station: e.g., in the horizontal direction, and in doing so to traverse a number of adjacent horizontal paths which is twice as great as the number needed to ensure a sufficient amount of vertical detail. This entire group of scanning lines consists of two interleaved sets each of which contains a number of lines sufficient to provide the requisite amount of vertical detail in the reproduced image. While the beam scans the lines of one interleaved set, a potential of appropriate magnitude is applied between the electron gun and the storage screen to cause the beam electrons to strike the screen at points where it constitutes a solid obstacle. Any beam electrons which may pass through the perforations of the storage screen are prevented from reaching the luminescent screen by application of a suitable stopping potential to a subsidiary blocking grid. For a brief moment during the traverse of each horizontal line of this first set of lines the beam is modulated by the incoming vision signal, and thus creates on the screen a minute localized region whose charge density is related to that of a corresponding portion of the scene. To facilitate storage of this localized charge at discrete locations on the storage screen, the beam is caused momentarily to pause in its movement, while the modulating signal is applied. The operation selected is such that the application of a new modulating signal to each point of the storage screen alters the charge localized at that point due to a prior charge to the value required by the new modulating signal.

On the other hand, while the beam traverses the lines of the second interleaved set a different potential is applied between the gun and the storage screen whose effect is to prevent beam electrons from impacting the solid material of the storage screen but to permit them to pass through its perforations in numbers controlled by the adjacent storage screen charge patterns established during the prior scan of the lines of the second set. The electrons which thus pass through the storage screen proceed to the luminescent screen there to form a visible image of the scene. To permit them so to reach the luminescent screen the stopping potential is, of course, removed from the blocking grid during each scan of the lines of the second set.

After the completion of a number of full scans of the second set of lines of the storage grid equal to the number of vertical lines in a single complete scan of the photosensitive screen at the transmitter station, a new charge image of the following scene will have been laid down on the receiver storage screen, localized at those portions which were traversed in the first interleaved scan. The roles of the first and second interleaved sets of scanning lines are now interchanged and the image of the second scene is displayed during scanning of the second interleaved set while the image of the third scene is recorded on the storage screen during the scanning of the lines of the first interleaved set.

The foregoing operations require precise control by associated switching apparatus. The invention provides such apparatus which, while complicated to describe, may be constructed ruggedly and compactly and operates with reliability and certainty.

The invention will be fully apprehended from the detailed description of an illustrative embodiment taken in connection with the appended drawings in which.

Figure 3:
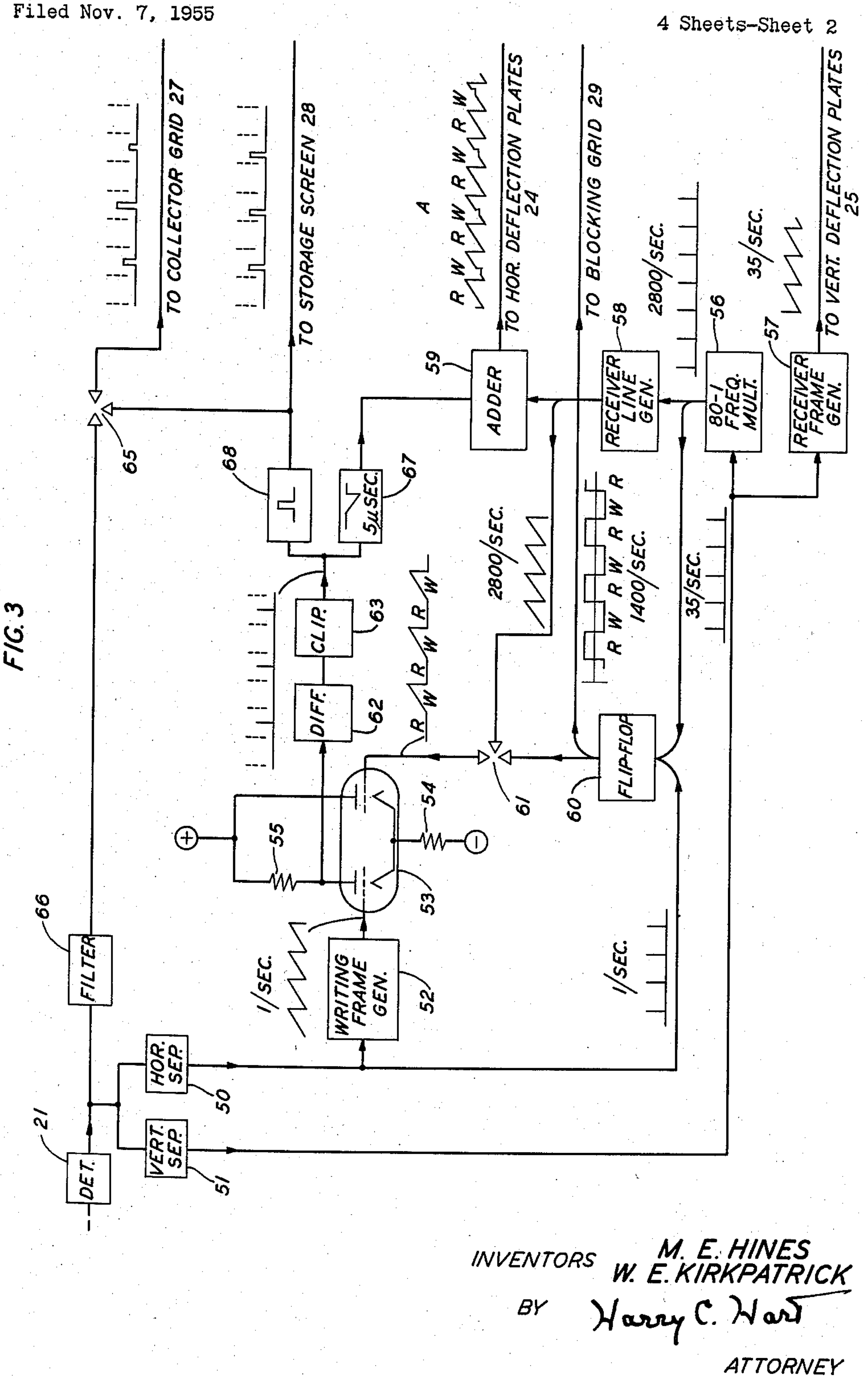
Figure 4:
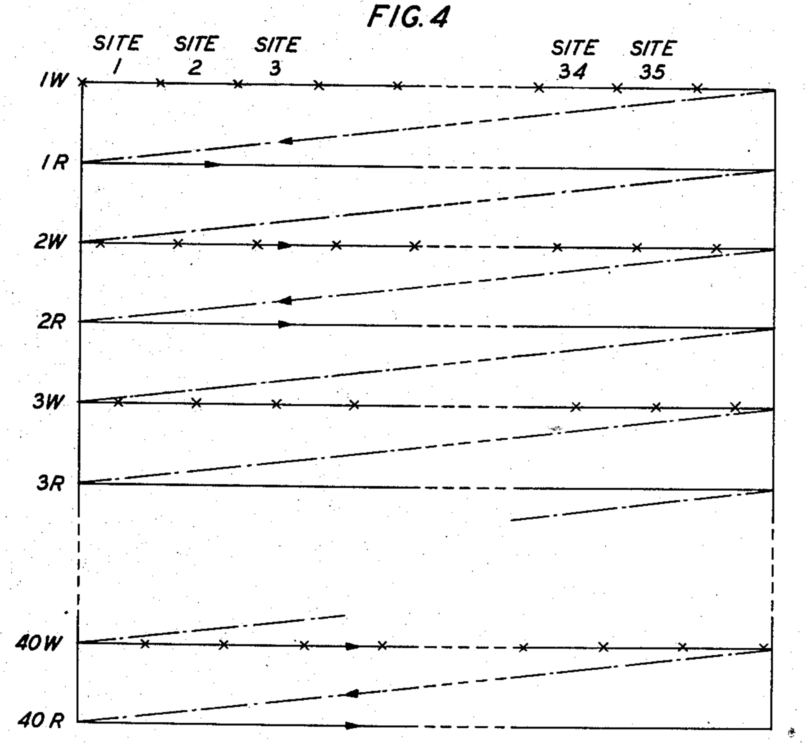
Figure 6:
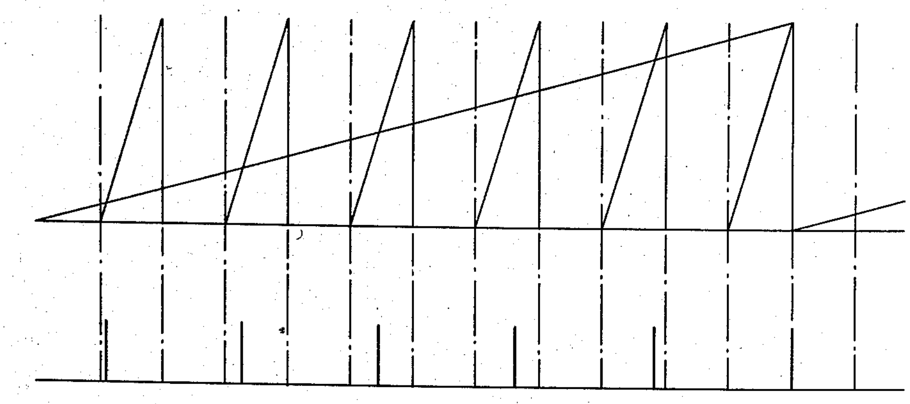
Figure 5:
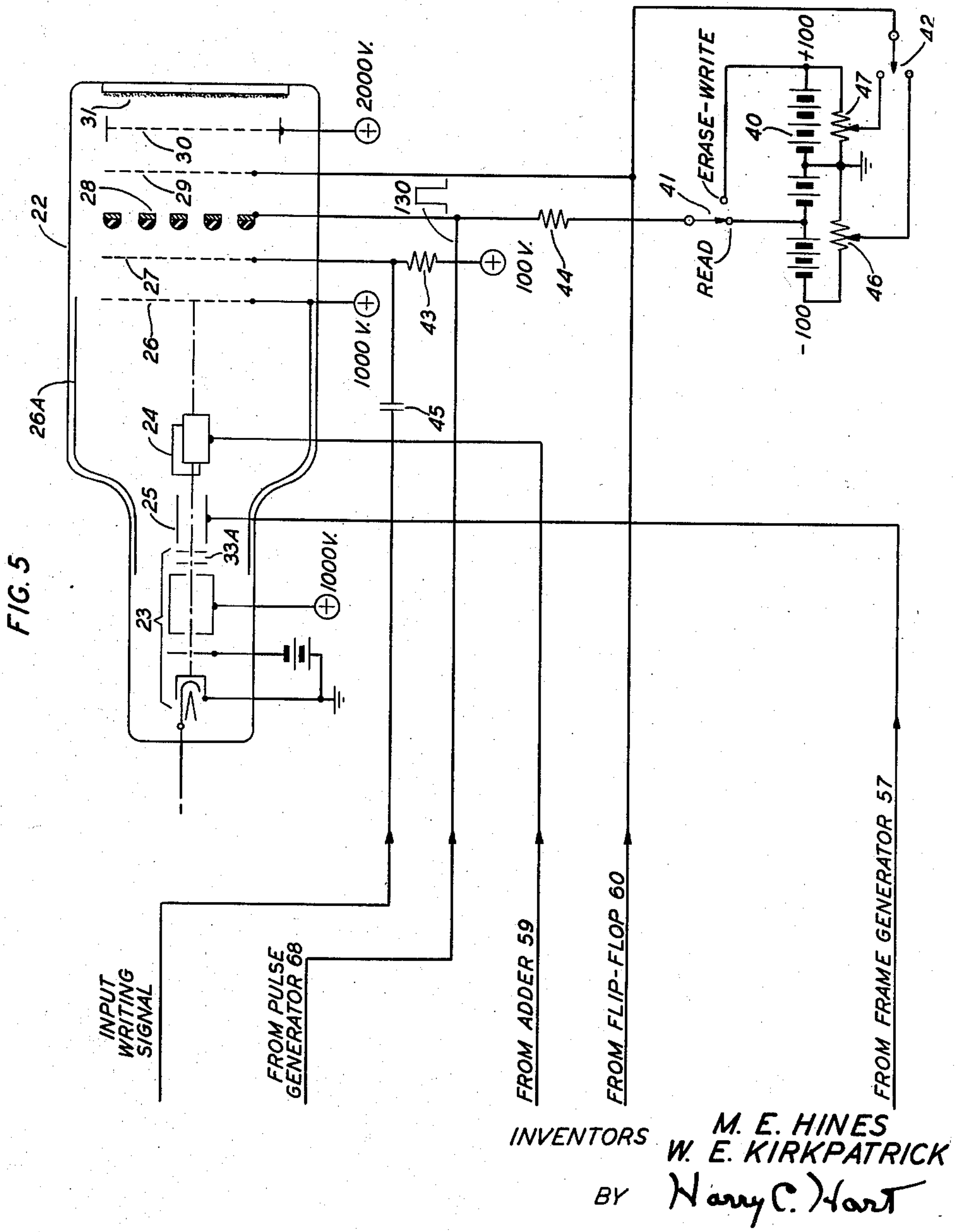

Figs. 3 and 5, taken together, show receiver apparatus in accordance with the invention, Fig. 5 showing a reproducer tube and Fig. 3 switching and control circuits therefor;

Fig. 4 is a diagram indicating the order of scanning in the receiving apparatus of Fig. 5; and Fig. 6 is a waveform diagram of assistance in explaining the operation of the apparatus of Figs. 3 and 5.

Figures 1, 2:
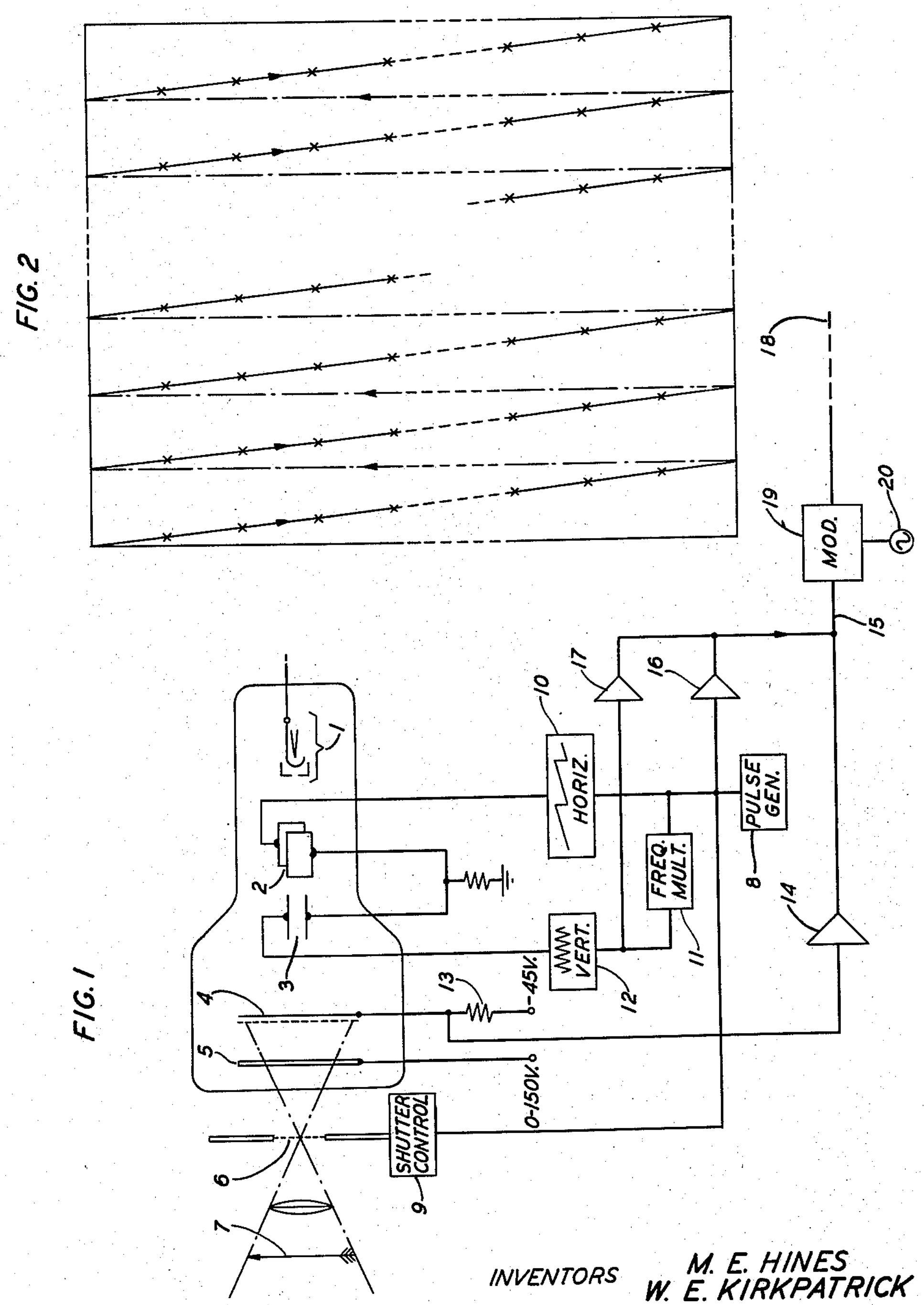
Fig. 1 shows transmitter apparatus in accordance with the invention.
Fig. 2 is a diagram indicating the order of scanning in the transmitter apparatus of Fig. 1.

Referring now to the drawings, Fig. 1 shows transmitter station apparatus comprising a beam tube having an electron gun 1, beam deflecting elements 2, 3, a photosensitive screen 4 of the charge storage type, and a secondary electron collector 5. This structure is conventional as are also beam focussing electrodes which are not shown. It may be of the type which is sold on the open market under the name "Iconoscope." A shutter, e.g., a conventional camera shutter 6, is mounted in front of the face of the tube and in a position to shield the photosensitive screen 4 from a scene 7 or to expose it to the scene as required.

In accordance with the invention this shutter 6 is opened periodically for an interval which is short compared with the period, e.g., once per second and for 1/30 second. Pulses for this purpose are derived from a pulse generator 8 and applied to a shutter-control mechanism 9 such as a solenoid. The pulse output of this generator trips a horizontal sweep generator 10 which delivers to the horizontal deflecting elements 2 a saw-tooth wave having a frequency of one cycle per second. Each pulse of the same train actuates a 35-to-1 frequency multiplier 11 which accordingly delivers thirty-five pulses per second to a vertical sweep generator 12 whose output is applied to the vertical deflecting elements 3 of the tube. As a result the cathode beam from the gun scans the area of the photosensitive screen 4 in a vertical or nearly vertical direction along thirty-five adjacent lines which are displaced from each other horizontally. The order of scanning is indicated in Fig. 2. Crosses on these vertical lines indicate the idealized locations of individual elements of the image on the screen 4.

The resulting image signal, which evidently occupies a very narrow frequency band as compared with conventional television signals, appears across load resistor 13 connected to the storage screen 4 and may be passed through a buffer amplifier 14 to a conductor 15. Horizontal and vertical synchronizing signals, derived respectively from the basic timing pulse generator 8 and from the output of the frequency multiplier 11 through buffers 16, 17 may be added to the outgoing signal. The signal may be transmitted over an outgoing line 18 in any desired fashion, e.g., by carrier techniques, to which end it is applied to a modulator 19 to which is also applied the output of a carrier generator 20.

At the receiver end of the system, shown in Figs. 3 and 5, taken together, the incoming signal, after demodulation as by a detector 21 is applied to a direct view storage tube 22 which may, for exmaple, be of the construction described by Knoll, Rudnick and Hook in an article entitled "Viewing Storage Tubes With Half Tone Display" published in the RCA Review for December 1953, beginning at page 492, but having certain additional features which will be apparent.

Fig. 5 is a schematic cross-sectional view of the elements of such a tube. They comprise, in order, an electron gun 23, beam deflecting elements 24, 25, an accelerator grid 26, a collector grid 27, a storage screen 28, a blocking grid 29, a second accelerator grid 30 and a luminescent screen 31. Usually, a phosphor is applied to the inside face of the end wall of the glass envelope of the tube 22. The storage screen 28 comprises a metal wire mesh, to which dielectric material has been applied on the side facing the gun 23. The gun 23 comprises a conventional electron emissive cathode and focussing and accelerating electrodes.

Fig. 5 also shows, in a highly schematic form and by way of explanation only, potential supplies and switching apparatus which enable such a tube to operate in the fashion required for the purposes of the invention. The full operating cycle comprises a "Write" operation, a "Read" operation and an "Erase" operation. The last of these requires only a brief interval and may indeed coincide in time with the following "Write" operation. Hence the cycle is divided into two equal parts which may be termed, respectively, the "Write" operation and the "Read" operation which includes the "Erase" operation.

The collector grid is connected by way of a load resistor 43 to a source of a suitable positive potential, e.g., 100 volts measured with respect to the potential of the electron gun 23 or ground. The conductive mesh of the storage screen 28 is connected by way of another load resistor 44 to the moving contact of a switch 41, by way of which "Read" potentials or "Write" potentials may be applied to it, as required, from a battery 40.

For the "Write" operation it is required to charge each selected portion of the dielectric material of the storage screen 28 to a potential which is representative of the incoming image signal. In principle, it is possible to apply such incoming image signals to some element of the electron gun 23. This, however, would involve a dependence of the focussing action and the beam deflecting action on the incoming signal. Inasmuch as these dependencies are undesirable, it is preferred to apply the incoming signal by way of a blocking condenser 45 across the load resistor 43 to the collector grid 27, and to provide that the incoming signal shall charge the storage screen 28 to a suitable potential or not, in dependence on whether the tube 22 is operating in the "Write" portion of its cycle or in the "Read" portion, by application of appropriate controlling potentials to the conductive mesh of the storage screen 28.

To this end the storage screen 28 may be connected, by way of the switch 41, to a point of positive potential equal to the steady positive potential of the grid 27; i.e., to the positive 100 volt terminal of the battery 40. It is well known that in such a situation, and provided the secondary electron emission ratio of the dielectric material of the storage grid 28 is in excess of unity, the storage screen 28 adopts the potential of the collector grid, whatever this may be. Thus the potential increment of any particular part of this storage screen due, for example, to a prior stored charge, is wiper out or erased merely by the action of throwing the moving arm of the switch 41 to the right-hand terminal. But in accordance with the invention, and virtually simultaneously with this erasure, a new charge image is stored on the screen 28 by the application of a pulse representative of an incoming image signal through the blocking condenser to the collector grid. The normal unmodulated collector grid potential being +100 volts, and with a vision signal amplitude in the range 0–25 volts, the actual instantaneous potential of the collector grid 27 during the application of such a vision signal pulse lies in the range 100–125 volts.

Hence when the switch 41 is thrown to the right and 100 volts are thus applied to the conductive mesh of the storage screen 28, the dielectric material which overlies the conductive mesh is charged locally, at the point impacted by the beam, to some potential lying in the range 100–125 volts; i.e., to a potential representative of the amplitude of the incoming vision signal.

In this illustration the magnitudes of the potentials are chosen to accord with the secondary electron emission properties of conventional materials. Suitable materials, incorporated in devices of the character here used for illustration, are described in "Storage Tubes" by M. Knoll and B. Kazan (Wiley, 1952). In this publication, as well as elsewhere, it is shown that a threshold value of the potential of the storage screen 28, measured with respect to that of the electron gun 23, exists such that, when this potential difference exceeds the threshold value, the screen 28, upon being impacted by electrons of the beam, is caused, by emission of secondary electrons from the dielectric material of the screen 28 and flow of such electrons to the collector grid 27, to rise or to fall as required to the potential of the collector grid 27. On the other hand, when this potential difference is less than the threshold value, secondary emission from the dielectric portions of the screen is insufficient to produce this result, and the dielectric portions of the screen 28 therefore remain substantially at the potential of the electron source, or cathode of gun 23. A usual value for this threshold or "first cross-over" potential, as it is sometimes termed, is 50 volts; and the magnitudes of 100 volts for the collector potential, −30 volts for the rest potential of the screen 28, 100 volts for its "Write" potential and 0–25 volts for the vision signal amplitude, are chosen accordingly.

During this "Write" operation some electrons naturally follow trajectories which lead them to the perforations of the storage screen 28. Such electrons may pass through such perforations and might strike the luminescent screen 31 but for the interposition of the blocking grid 29 to which, during the "Write" operation a stopping potential is applied. To this end the grid 29 is connected by way of a switch 42 to a point of negative potential as by a movable contact on a resistor 46 which shunts the negative portion of the battery 40.

For the "Read" condition the stopping potential is removed from the blocking grid 29 and a small positive potential is applied to it by way of the switch 42 as from a movable contact on a resistor 47 which shunts the positive portion of the battery 40. Electrons of the beam which pass through the perforations of the storage grid 28 may now reach the luminescent screen 31. They do so in quantities dependent on the distribution of localized charges on the dielectric material bounding each perforation, i.e., in dependence on the charge image earlier stored on the storage grid 28. During this part of the cycle electrons of the beam are prevented from impacting the solid material of the storage screen 28, and so from modifying the charge image stored thereon, by connection of the storage grid 28 to an appropriate negative potential such as −30 volts, illustrated in Fig. 5 by one contact of the switch 41.

In the operation of the apparatus of Fig. 5 in accordance with the present invention the electron beam is caused to scan the area of the storage screen 28 in a direction perpendicular to the direction of scanning of the photosensitive screen 4 at the transmitter station. Specifically, in the example chosen, the beam of the display tube 22 scans its storage screen 28 along each of a number of horizontal lines which are displaced from each other in the vertical direction. The number of such horizontal lines is twice the number needed for reproduction of an image in the required amount of detail; e.g., if a forty line picture is required, the scanning takes place eighty adjacent horizontal lines. Furthermore, a complete scan of eighty lines is required to take place in the time during which the transmitter tube beam makes a single traverse of the photo-sensitive screen 4 in the vertical direction. There being a number, e.g., thirty-five, such vertical traverses at the transmitter along adjacent vertical lines, there are a like number of complete scans of the entire area of the storage screen 28 in the display tube 22.

The entire number of lines, e.g., eighty, of which a single complete scan of the display tube storage screen is composed, may be treated as two interleaved sets, each set compriseing forty lines. Throughout one complete cycle of operations, e.g., throughout an entire second, one of these sets comprises "Write" lines and the other set comprises "Read" lines. This situation is depicted in Fig. 4 for a cycle in which one set of alternate lines marked "W" serve as "Write" lines while the other set of alternate lines marked "R" serve as "Read" lines.

The switching apparatus to be described operates in conjunction with the tube structure of Fig. 5 to cause the display tube cathode beam to deposit a localized charge on the storage screen 28 in proportion to the incoming vision signal in the locations and in the order indicated by the crosses of Fig. 4. Thus the complete scanning sequence is as follows: scan line 1W and write site 1; scan line 1R; scan line 2W and write site 1; scan line 2R; scan line 3W and write site 1; . . . scan line 40W and write site 1; scan line 40R; scan line 1W and write site 2; scan line 1R; . . . This sequence proceeds until site 35 is reached. Hence, the two last steps are: scan line 40W and write site 35; scan line 40R.

Fig. 3 shows associated apparatus for carrying out the required operations. Numerical relations embodied for the sake of illustration are those which hold for the transmission of an image consisting of forty horizontal lines and thirty-five distinguishable picture elements per line, and for exposure of the transmitter tube to the scene once each second.

The incoming vision signal, containing vertical and horizontal synchronizing pulses, after demodulation by the detector 21, is applied to horizontal and vertical synchronizing pulse separators 50, 51. The horizontal pulse separator 50 delivers a train of pulses at the rate of one pulse per second while the vertical pulse separator 51 delivers a train at the rate of thirty-five pulses per second. The pulses of the first train are applied to a Writing frame generator 52 which delivers a saw-tooth output wave having a one second period. This wave is applied to the input point of a differential amplifier, e.g., to the first grid of a double triode 53 whose cathodes are connected together and by way of a coupling resistor 54 to a source of negative potential. The left-hand anode is connected by way of a load resistor 55 to a positive potential source and the right-hand anode is connected directly to this positive potential source. This differential amplifier 53 acts as a sensing circuit in a manner described below.

The thirty-five per second train of pulses derived from the vertical separator 51 is applied to an 80-to-1 frequency multiplier 56 and to a receiver frame generator 57. The output of the frame generator is a saw-tooth wave train of a frequency of thirty-five cycles per second for application to the vertical beam deflecting elements 25 of the display tube 22. The output of the multiplier 56 comprises a train of pulses whose frequency is 2,800 pulses per second. The pulses of this train are applied to a receiver line generator 58 whose output is a saw-tooth wave whose frequency is 2,800 pulses per second. This wave is applied, through an adder 59 in which it is modified in a fashion to be described, to the horizontal deflection elements 24 of the tube 22 to control the horizontal sweep of the beam.

The 2,800 per second pulse train output of the multiplier 56 is also applied to the input point of a bi-stable circuit 60 hereinafter designated "flip-flop." The flip-flop 60 shifts abruptly from one to the other of its two stable conditions for each input pulse so that its output comprises a square wave of 1,400 cycles per second frequency, alternately opposite polarity portions of which are designated "W" and "R." This wave, in accordance with the present invention, is applied to the blocking grid 29 of the tube 22 of Fig. 5, thus causing it to stop beam electrons which pass through the perforations of the storage screen 28 from reaching the luminescent screen 31 during all W parts of the wave and, in alternation therewith, to admit such electrons to the luminescent screen 31 during all R portions of the wave.

This square wave output of the flip-flop 60 is also applied to the control terminal of a gate 61 to whose input conduction terminal the 2,800 per second saw-tooth wave output of the receiver line generator 58 is applied. The gate, which may be of any well known construction, passes the input wave during the positive portions of the output wave of the flip-flop 60 and blocks it during the negative portions. As a result the wave on the output terminal of the gate 61 comprises a sequence of saw teeth alternating with blanks, i.e., steady potential portions. The saw teeth are designated "W" while the blanks are designated "R." This wave is applied to the right-hand grid of the double triode 53 of the sensing circuit.

For proper operation of the sensing circuit it is of advantage that the amplitudes of the saw-tooth waves applied to its two grids should be alike. This likeness of amplitude can be assured by means well known in the art such as potentiometers, amplifiers and the like which are omitted from the drawing to avoid undue complexity. With the proviso that the amplitudes of the waves applied to the two input points of the sensing circuit have been so equalized, the operation of the sensing circuit is to provide an output across the load resistor 55 of the left-hand tube portion when, and only when, the potential applied to the left-hand grid exceeds the potential applied to the right-hand grid. As explained above, the frequency of the wave applied to the left-hand grid is one cycle per second while that of the wave applied to the right-hand grid is 2,800 cycles per second. Hence, 2,800 cycles, of which 1,400 are steeply rising saw teeth, are applied to the right-hand grid for each of the gently rising saw teeth applied to the left-hand grid. This situation is depicted in Fig. 6 from which it appears that the output of the sensing circuit comprises a sequence of 1,400 pulses during each second, the instants at which they occur advancing progressively from the beginning to the end of this second as determined by the gradual rise of the low frequency saw-tooth wave in conjunction with the steeper rises of the higher frequency saw-tooth waves.

This pulse train is applied to a differentiator 62 which acts to sharpen the output pulses of the sensing circuit, leaving them in the progressively advancing phase relations just described. Negative going pulses may then be blocked as by a clipper 63.

This pulse sequence is applied to the control terminal of a sampling gate 65. The incoming vision signal, from which synchronizing pulses have been removed by a filter 66, is applied to the conduction terminal of this sampling gate. As a result the incoming vision signal is sampled 1,400 times per second and at instants which progress gradually from the beginning to the end of the cycle in the fashion described above. The duration of each such sample may advantageously be 5 microseconds, and the gate 65 may be constructed accordingly. Aside from incidental delays which may be compensated in well known fashion, these sampling instants thus correspond precisely with the instants indicated by cross marks on Fig. 2 for the transmitter tube scanning operation. It is these samples which, in accordance with the invention, are now to be applied as control signals to the collector grid 27 of the display tube 22 of Fig. 5, thereby to bring each particular area of the dielectric material of the storage screen 28 to a potential representative of the signal sample and so, in effect, to "Write" a localized charge at the correct location of this screen in proportion to the amplitude of the incoming vision signal sample.

Correctness of proportionality is achieved in the fashion heretofore described, i.e., by control of the characteristics of the storage screen 28 and adjustment of its controlling potentials. Correctness of the location at which this charge is stored on the screen is achieved in the following fashion.

The pulse train output of the clipper 63 is applied in parallel to two pulse generators 67, 68. Of these, the generator 67, which may be a relaxation oscillator or the equivalent delivers, for each input pulse, an output pulse having the form of an inverted saw tooth and enduring for a fraction of the duration of a single horizontal scanning period, e.g., for five microseconds. The slope of the falling portion of the saw tooth should be equal to the slope of the rising portion of each of the saw teeth of the output wave of the receiver line generator 58. Means such as adjustable amplifiers and attenuators are well known in the art for securing this equality of slope.

This wave is applied to the second input point of the adder 59. As described earlier, the saw-tooth wave output of the receiver line generator 58 is applied to the first input point of this adder 59. The sum of these two waves, which appears on the output terminal of the adder, is thus a sawtooth wave like the output of receiver line generator 58 except that every alternate one of its saw teeth, i.e., those designated "W" saw teeth, is modified by a brief interval, of five microseconds duration, in which the output does not change but remains at a steady value. These brief unchanging intervals are those in which the negative output of the pulse generator 67 exactly compensates the positive output of the receiver line generator 58. Moreover these intervals, at which the output wave of the adder remains steady, creep progressively forward in phase throughout the entire one second cycle of operation, appearing close to the initial part of the earlier W teeth of the cycle and close to the terminal parts of the later W teeth of the cycle.

In accordance with the invention, the wave output of the adder 59 is applied to the horizontal deflecting elements 24 of the display tube 22, thus to govern the horizontal movement of the cathode beam as it scans the storage screen 28. Evidently, the beam scans each "Read" line at uniform speed, but, in scanning each "Write" line, makes a five microsecond pause at a point of the line scan which advances progressively from line to line.

In accordance with the invention, it is during each of these pauses of the cathode beam in its line scan that the electrons of the beam impact the storage screen while at the same time the collector grid 27 is modulated by a vision signal sample which passes through the sampling gate 65. Hence, the beam deposits on the storage screen, at each of the successive locations determined by the pauses in its horizontal deflection, an electrostatic charge which is proportional to the corresponding sample of the incoming vision signal.

As explained in connection with the discussion of the display tube 22 itself (Fig. 5), it is also necessary, in order to deposit such a charge on the storage screen 28, that the screen itself be raised to the proper potential at which the electrons of the beam strike its solid portions in addition to passing through its perforations. In the discussion of Fig. 5, this was explained in connection with the manual switch 41 which, on being shifted from one contact to another, applies the Reading potential or the Writing potential as the case may be to the storage screen. In actuality this is accomplished in accordance with the invention by the momentary application to the storage screen 28 of a Writing pulse.

The pulse generator 68 which delivers pulses of the required form is tripped by each output pulse of the clipper 63. The pulse output of this generator 68, which endures for five microseconds, is of amplitude sufficient to shift the potential of the screen 28 from its "Read" value, e.g., −30 volts, to its "Write" value, e.g., 100 volts; i.e., it may be of 130 volts amplitude. This pulse acts simultaneously, in the manner described above, to erase any prior charge which may be retained on the storage screen 28 from a prior "Write" operation.

The pulse generator 68 itself may be constructed in various ways. It may, for example, comprise a monostable or single trip multivibrator, a relaxation oscillator followed by a clipper, or the like. The duration of the pulse may readily be adjusted by control of relaxation time and its amplitude may be adjusted in well-known fashion by control of gain or loss.

As with the pauses in the horizontal deflection of the beam, one of these "Write" pulses appears in each "Write" interval, and they advance progressively in phase from each "Write" interval to the next one throughout the entire scanning cycle.

As explained above, at the conclusion of each full second of operation, occupied by thirty-five complete scans of both interleaved sets of scanning lines, the roles of "Read" lines and "Write" lines are to be interchanged. This interchange may be accomplished very simply by the application, once each second, of an additional pulse derived, for example, from the horizontal synchronizing pulse separator 50 to the input point of the flip-flop 60. By this means an abrupt phase reversal is produced in the output of the flip-flop 60 after 1,400 full cycles of its operation. Inasmuch as the output wave train of the flip-flop 60 exclusively determines one of the two interleaved sets of scanning lines as a "Read" line set and one as a "Write" line set, this auxiliary inverting pulse is all that is necessary completely to effect the interchange of roles.

It will be observed that time relations as between horizontal scanning operations and vertical scanning operations, and also as between the operation of the receiver and the operation of the transmitter, are ensured in the system described by virtue of the central control of all such operations by the transmitted synchronizing pulses. Furthermore, the progressive advance of the Writing operation throughout the full scanning cycle is ensured by the employment of the cathode-coupled sensing circuit 53 whose output pulses advance progressively in phase throughout the cycle in precisely the fashion required for deposit of each new charge increment on that portion of the storage screen 28 where it is needed in order that undistorted reproduction of the transmitted scene shall take place.

Variations of the switching system described are possible with no change in the direct view storage tube described. Furthermore, modifications of the storage tube described are possible without departing from the spirit of the invention. Corresponding variations of the switching apparatus described will suggest themselves to those skilled in the art.

What is claimed is:

1. A picture communication system which comprises, at a transmitter station, an image signal generator having a photosensitive storage screen, means for briefly exposing said screen once in each time unit to a scene, thereby to establish on said screen an electric charge image of said scene, means for scanning said image along each of a number $n$ of parallel lines extending in a $y$ direction and spaced from each other in an $x$ direction, normal to said $y$ direction, to derive image signals, each of said $n$ lines containing $m$ distinguishable picture elements, said scanning occupying an entire time unit, means for transmitting said image signals to a receiver station and, at said receiver station, an image reproducer having a storage screen and a luminescent screen, means for scanning the storage screen of said reproducer along $2m$ adjacent parallel lines extending in the $x$ direction and displaced from each other in the $y$ direction in $1/n$ of a time unit, means for repeating said last-named scanning $n$ times during said time unit, means controlled by said transmitted image signals for writing a short space pattern counterpart of a brief portion of said signal on each odd numbered scanning line, and means, operative throughout each even numbered line scan, for converting a space pattern previously written thereon into a visible image on said luminescent screen.

2. A picture communication system which comprises, at a transmitter station, an image signal generator having a photosensitive storage screen, means for briefly exposing said screen, once in each time unit, to a scene, thereby to establish on said screen an electric charge image of said scene, means for scanning said image along each of a number $n$ of parallel lines extending in a $y$ direction and spaced from each other in an $x$ direction, normal to said $y$ direction to derive image signals, each of said $n$ lines containing $m$ distinguishable picture elements, said scanning occupying an entire time unit, means for transmitting said image signal to a receiver station and, at said receiver station, an image reproducer having a storage screen and a luminescent screen, means for scanning the storage screen of said reproducer along $2m$ adjacent parallel lines extending in the $x$ direction and displaced from each other in the $y$ direction, in $1/n$ of a time unit, means for repeating said last-named scanning $n$ times during said time unit, means coupled to and synchronous with said scanning means for deriving a sequence of brief samples of said vision signal, one during each alternate one of said $2m$ line scans and at instants which advance progressively from the beginning to the end of a line scan throughout said entire time unit, means controlled by each of said image signal samples for establishing on said storage screen an electric charge of a magnitude representative of said sample and localized at an elemental area of said storage screen which is instantaneously impacted by said beam in the course of its scanning movement, and means, operative throughout every other one of said $2m$ line scans, for converting a space pattern previously recorded thereon into a visible image on said luminescent screen.

3. Apparatus for reproducing a succession of images of a like succession of scenes of a field of view from an incoming image signal wave, each period of which is representative of one of said scenes, which comprises an image display device having a luminescent screen, a storage screen, beam deflecting elements, and an electron gun for projecting a sharply focussed beam on a selected element of said storage screen, means including said deflecting elements for deflecting said beam to scan said storage screen along adjacent lines thereof, potential means for conditioning said beam, while scanning odd numbered lines of said storage screen, to write thereon a space pattern counterpart of an applied signal, means for briefly applying a portion of said incoming wave to said gun during a portion of each of said odd numbered scans to modulate the strength of said beam, and thereby to write on a fractional part of each of said odd numbered lines a space pattern counterpart of said portion of said incoming wave, and means for conditioning said beam, while scanning even numbered lines, to convert a space pattern written thereon into a visible image on said luminescent screen.

4. In combination with apparatus as defined in claim 3, means, operative upon the completion of a preassigned number of scans of all of the lines of said storage screen for shifting said beam in a direction normal to the direction of said scanning lines by the width of a single one of said scanning lines, alternate ones of said shifts being in opposite directions.

5. Apparatus for reproducing a succession of images of a like succession of scenes of a field of view from an incoming image signal wave, each period of which is representative of one of said scenes, which comprises an image display device having a luminescent screen, a storage screen, an electron gun for projecting a sharply focussed beam on an element of said storage screen and beam deflecting elements, means including said deflecting elements for deflecting said beam to scan said storage screen along adjacent lines thereof, means controlled by said signal wave for causing said beam, while scanning selected ones of said lines at a first rate, to write on said screen a space pattern counterpart of said incoming wave, and means for conditioning said beam, while scanning others of said lines at a second rate, to convert a space pattern written thereon into a visible image on said luminescent screen.

6. In combination with apparatus as defined in claim 5, means, operative upon the completion of a preassigned number of scans of all of the lines of said storage screen for shifting said beam in a direction normal to the direction of said scanning lines by the width of a single one of said scanning lines, alternate ones of said shifts being in opposite directions.

7. Apparatus as defined in claim 5 wherein said selected lines are odd numbered lines and the remaining ones of said lines are even numbered lines.

8. In a picture communication system, means at a transmitter station for establishing an image of a scene, means for scanning said image once in a preassigned time interval in one direction at a relatively low speed to derive image signals, means for transmitting said image signals to a receiver station and, at said receiver station, a storage screen, means for repeatedly scanning said screen during said time interval in a perpendicular direction at a relatively high speed, means for establishing on said screen, during selected ones of said scans, a space pattern image counterpart of said image signals, and means, operative during the remaining ones of said scans, for rendering visible a space pattern image previously established on said screen.

9. A picture communication system which comprises, at a transmitter station, an image signal generator having a retentive screen, means for exposing said screen to a scene, thereby to establish an image thereon, said image having $m.n$ distinguishable picture elements, means for scanning said image along each of a succession of $n$ approximately vertical lines, to derive, for each such vertical scan, a vision signal portion representative of $m$ distinguishable picture elements, each of said vertical line scans occupying $1/n$ of a time unit, means for transmitting said vision signal to a receiver station, and, at said receiver station, an image reproducer having a storage screen and a luminescent screen, means for scanning the storage screen of said reproducer along $2m$ adjacent substantially horizontal lines in $1/n$ of said time unit, means for repeating said last-named scanning operation $n$ times in said time unit, means controlled by said vision signal for establishing a charge image on said reproducer storage screen during certain ones of said line scans, and means, operative during others of said line scans for converting a charge image previously stored thereon into a visible image on said luminescent screen.

10. Apparatus for reconstructing an image of a scene from incoming image signals representative of said scene, which comprises an image reproducer comprising a perforated storage screen, a luminescent screen, a blocking grid interposed between said screens, a gun for projecting an energy beam on a selected point of said storage screen, and beam deflecting elements, means including said elements for deflecting said beam to scan said storage screen along lines of two interleaved sets, means under control of said incoming signals and operative during line scans of said first interleaved set for modulating said beam, thereby to establish a space pattern of local charges on said storage screen representative of said image signals, and means operative during line scans of said second interleaved set for transferring a space pattern previously established on said storage screen in the course of scans of said first interleaved set to said luminescent screen, thereby to create a visible image.

11. In combination with apparatus as defined in claim 10 means for applying a beam-stopping potential to said blocking grid during line scans of said first interleaved set, and means for removing said stopping potential during line scans of said second interleaved set.

12. In a picture communication system, means at a transmitter station for establishing an image of a scene, means for scanning said image once in a preassigned time interval along lines in one direction at a relatively low speed to derive image signals, means for transmitting said vision signals to a receiver station and, at said receiver station, an image reproducer comprising means for projecting an electron beam, a perforated storage screen and a luminescent screen, means for repeatedly scanning said storage screen during said time interval along lines in a perpendicular direction at a relatively high speed, said last-named scanning lines constituting two interleaved sets, means for establishing on said storage screen, during the scans of the first said interleaved line set, a space pattern image counterpart of said image signals, and means, operative during the scans of the second said interleaved line set, for transferring a space pattern image established on said storage screen in the course of scans of said first interleaved line set to said luminescent screen, thereby to create a visible image.

13. In combination with apparatus as defined in claim 12 wherein said reproducer comprises a blocking grid interposed between said storage screen and said luminescent screen, means for applying a beam-stopping potential to said blocking grid during line scans of said first interleaved set, and means for removing said stopping potential during line scans of said second interleaved set.

14. Apparatus for reconstructing an image of a scene from incoming vision signals representative of said scene, which comprises a storage screen, a gun for projecting an energy beam on a selected point of said screen, and beam deflecting elements, means including said elements for deflecting said beam to scan said screen, means for introducing a succession of momentary pauses into said beam deflection, and means, operative only during each of said pauses, for modulating said beam by said incoming signals, thereby to establish localized charges on said screen.

15. Apparatus as defined in claim 14 wherein said beam deflecting means comprises means for generating a periodic wave of saw-tooth form and of preassigned slope, and means for applying said wave to said deflecting elements.

16. Apparatus as defined in claim 15 wherein said pause-introducing means comprises means for generating, during each of a plurality of selected periods of said saw-tooth wave, a single saw-tooth pulse, of slope equal to the slope of said saw-tooth wave, and means for combining said pulse with said selected saw-tooth wave periods in slope-offsetting relation.

17. In combination with apparatus as defined in claim 16, means for actuating said pulse generating means at instants which are progressively shifted in phase with respect to said saw-tooth wave.

18. In combination with apparatus as defined in claim 16, means for actuating said pulse generating means once during every alternate period of said saw-tooth wave.

19. In combination with apparatus as defined in claim 18, means, operative during periods of said saw-tooth wave which contain no pause, for rendering visible a charge image established on said screen during an earlier scan of said screen.

(References on following page)

References Cited in the file of this patent

UNITED STATES PATENTS

| | | |
|---|---|---|
| 2,259,507 | Iams | Oct. 21, 1941 |
| 2,280,191 | Hergenrother | Apr. 21, 1942 |
| 2.402.053 | Kell | June 11, 1946 |
| 2,748,312 | Beintema | May 29, 1956 |
| 2,813,148 | Pensak | Nov. 12, 1957 |
| 2,821,653 | Dyer | Jan. 28, 1958 |

FOREIGN PATENTS

| | | |
|---|---|---|
| 928,783 | France | June 16, 1947 |